United States Patent

[11] 3,572,757

[72] Inventor  Javier Sanglas Camps
　　　　　　　Paseo de Gracia 29, Barcelona, Spain
[21] Appl. No. 833,468
[22] Filed     June 16, 1969
[45] Patented  Mar. 30, 1971
[32] Priority  July 9, 1968
[33] 　　　　　 Spain
[31] 　　　　　 Pat. 356,171

[54] FOLDING FRAME FOR A MOTORCYCLE
　　　5 Claims, 13 Drawing Figs.
[52] U.S. Cl. ................................................ 280/278,
　　　　　　　　　　　　　　　　　　　　280/291, 180/33
[51] Int. Cl. .................................................. B62k 15/00
[50] Field of Search ........................................ 280/278,
　　　　　　　　　　　　　　　　　287, 291; 180/30, 33, 32

[56] References Cited
　　　　　UNITED STATES PATENTS
2,696,272　12/1954　Schlaphoff ................... 280/278X
2,839,146　 6/1958　Bouffort ....................... 280/278X
3,042,132　 7/1962　Bouffort ....................... 280/287X
3,354,976　11/1967　Camps .......................... 280/287X
3,483,937　12/1969　Vann ............................ 280/278X

*Primary Examiner*—Kenneth H. Betts
*Attorney*—Steinberg & Blake

ABSTRACT: A folding frame for a motorcycle, providing means for folding the handlebars, the front wheel and a footrest, and a complete system for lowering the seat. The folding operations of the various elements are effected by rotation around particular axes. When in the unfolded or operative position the various elements are firm enough not to undergo any change when the motorcycle is moving. The handlebars and the front wheel are folded in directions of rotation which converge towards the frame, and the footrest rotates into a position contiguous with the engine and thus to provide space to receive the folded front wheel.

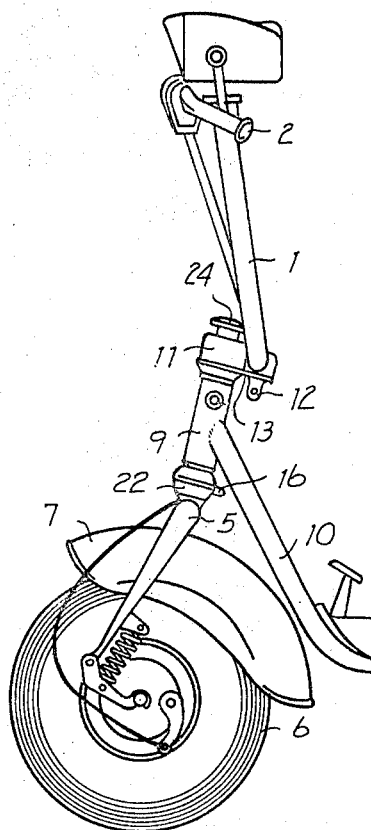
FIG.1
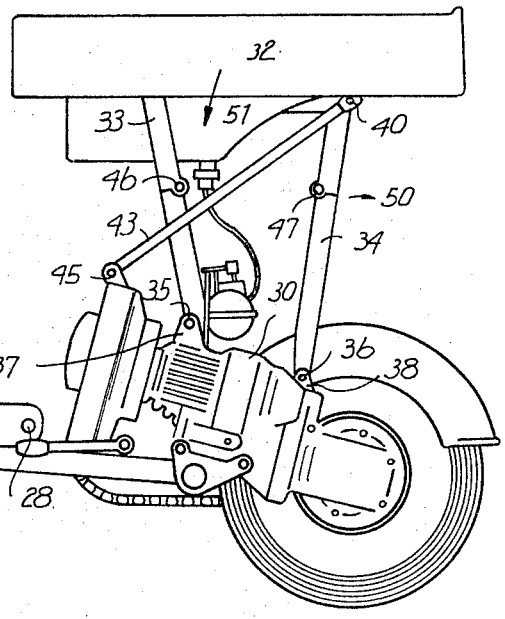
FIG.2
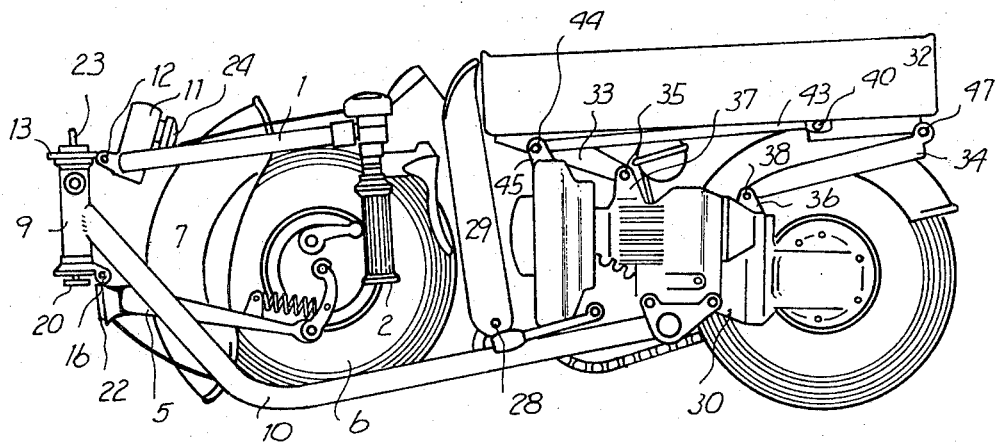

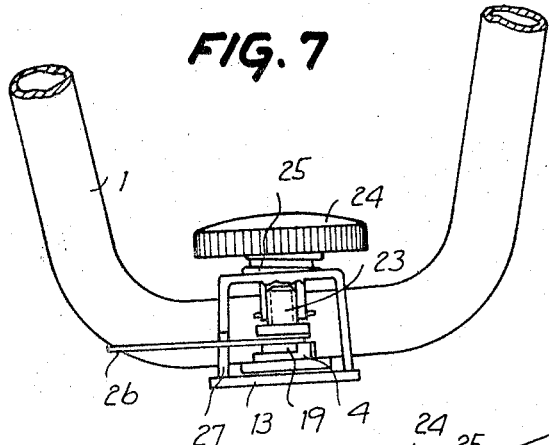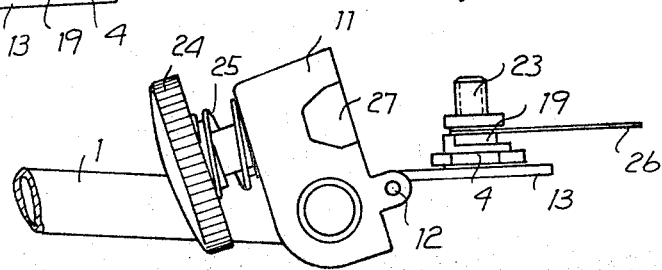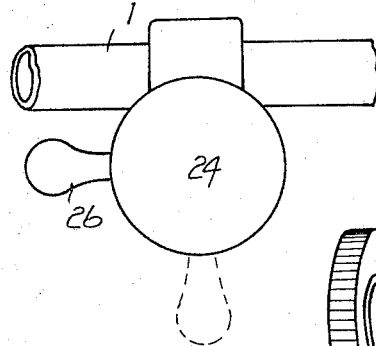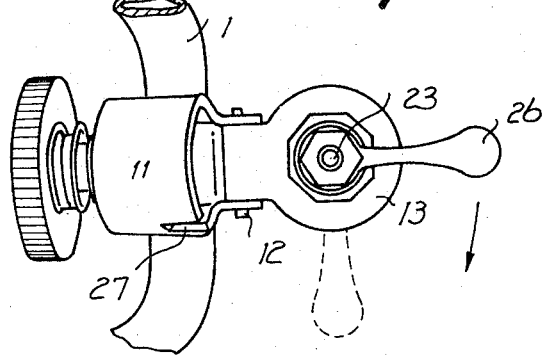

PATENTED MAR 30 1971 3,572,757
SHEET 5 OF 5
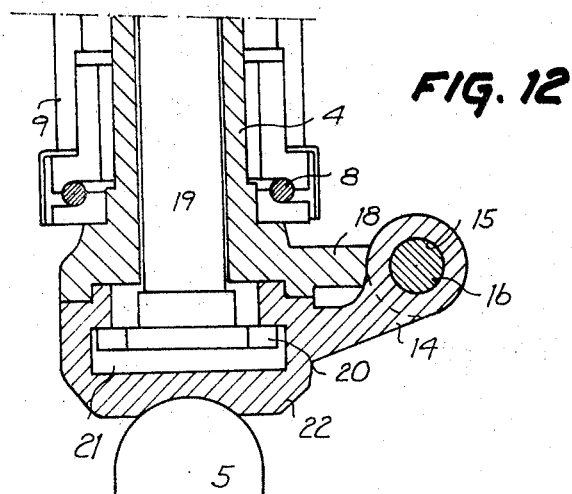
FIG. 12
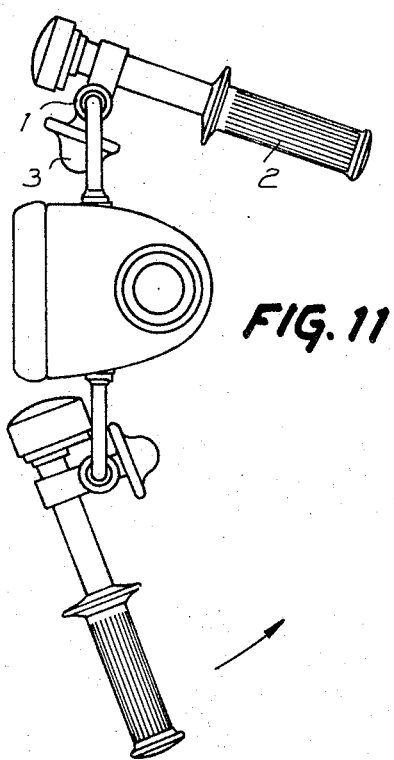
FIG. 11
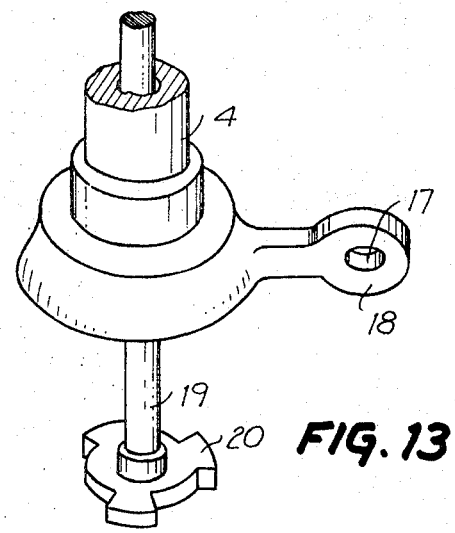
FIG. 13
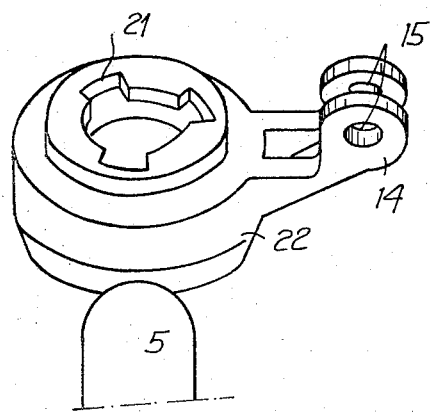
INVENTOR
JAVIER SANGLAS CAMPS
BY Stanley & Blake
ATTORNEYS

FOLDING FRAME FOR A MOTORCYCLE

This invention relates to a folding frame for motorcycles, the object being to provide improvements therein.

There are various known practical embodiments of folding frames for two-wheeled vehicles and they differ from one another in their actual uses, more particularly as regards their specific structural features. This invention leads to the discrete folding elements being completely rigid when folded and unfolded, and enables the vehicle to be reduced to a small size by a simple sequence of basic operations.

According to this invention, a folding frame for a motorcycle is characterized in that it comprises in combination mechanical means to enable handlebars and accessory elements and a front-wheel fork to be folded by rotational movements converging toward the frame and to enable a footrest to be folded to fit against an engine unit, a seat being pivoted to stationary parts of the motorcycle by pairs of rods each having a folding articulation and rotatable therearound and urged resilient means into an extended position and braced by struts to inhibit oscillation of the link mechanism provided by said rods when the same is in the extended position.

Basically, the invention provides, in practice, means for folding the handlebars, means for folding the front wheel, means for folding the footrest, and a complete system for lowering the seat. The folding operation of all these elements is always by rotation relatively to particular axes, and when in the unfolded or operative position the elements concerned are firm enough not to undergo any change when the vehicle is moving.

The handlebars and the front wheel are folded in directions of rotation which converge towards the frame, and the footrest rotates into a position contiguous with the engine, this movement being such that space for the wheel is left.

The seat-folding mechanism comprises a system of five rods on each side of the saddle, four of them being connected in pairs to an articulated system, the free ends being articulated to particular places of the seat and of the rear portion of the frame. The remaining bar is articulated to a place of the seat and to a place of the frame and is responsible for ensuring that the seat position stays fixed and does not shift in the direction of vehicle movement. The system of pairs of articulated rods provides a bearing base for the seat and obviates transverse movements thereof; to fold the saddle, bending proceeds around the common pivots, at which return springs are disposed.

One embodiment of the invention is shown in the accompanying drawings, wherein:

FIG. 1 is a side elevation of a motorcycle, in the position ready for use;

FIG. 2 is a side elevation of the motorcycle after it has been folded;

FIG. 7 is a front elevation of the handlebar joint in the position ready for use;

FIG. 8 is a side elevation of the handlebar joint in the folded position;

FIG. 9 is a plan view corresponding to FIG. 7;

FIG. 10 is a plan view corresponding to FIG. 8;

FIG. 11 is a plan view of the handlebars with one handlebar grip in the folded position;

FIG. 12 is a sectional elevation showing the jointed support of the front wheel; and FIG. 13 is a partly exploded perspective view of the front wheel jointed support.

Figure 3:
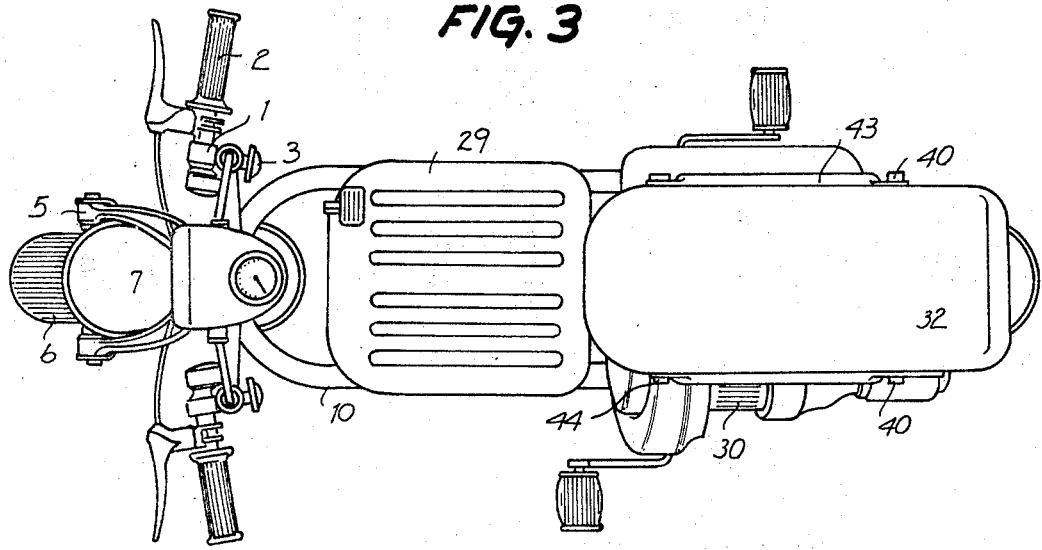
FIG. 3 is a plan view corresponding to FIG. 1.
Figure 4:
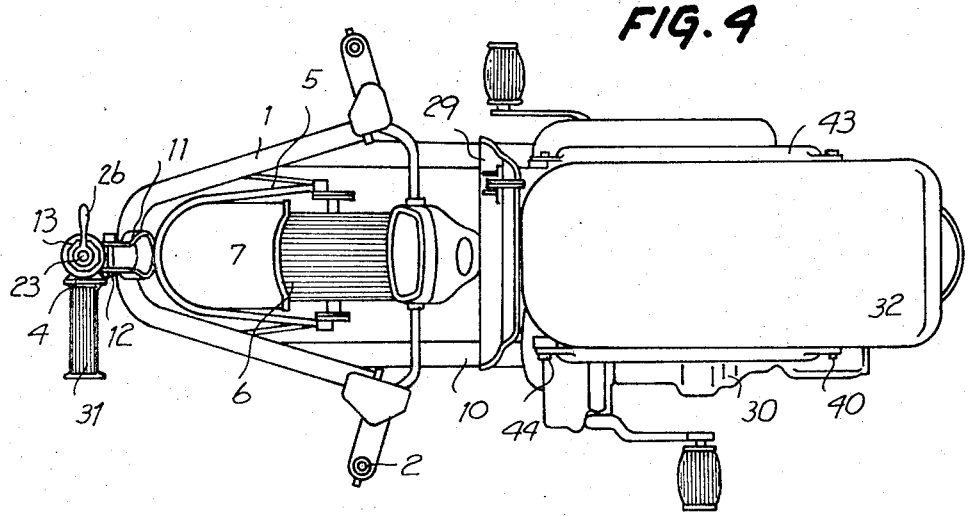
FIG. 4 is a plan view corresponding to FIG. 2.

The embodiment of the invention shown in the drawings comprises handlebars 1 having at their top ends grips 2 carrying the conventional levers and controls which can be seen in the drawings. The grips 2 are articulated to the handlebar ends and can be secured in a required position by screwed fastener facilities 3. The handlebars 1 are secured to a tubular member 4 carrying a fork 5 for a front wheel 6 and mudguard 7, and the tubular member 4 is rotatably mounted, by way of rolling bearings 8, in a bearing tube 9 rigidly secured to the front end of longitudinal rods 10 forming the motorcycle frame.

The handlebars terminate at their bottom end in a box 11 articulated by a transverse spindle 12 to a plate 13 rigidly secured to the tubular member 4. The fork 5 is secured to the bottom end of the member 4 through the agency of lugs 14 formed with apertures 15 aligned to receive a pivot spindle 16 which also is received in a corresponding aperture 17 in a lug 18 projecting from the bottom end of the member 4. A pin 19, freely rotatable in the tubular member 4, projects beyond both the top and bottom ends of said member. Below the member 4 the pin 19 terminates in a bayonet foot 20 engageable in a matching recess 21 in a box 22 rigidly secured to the fork 5, while at its top end the pin 19 terminates above the member 4 in a screw-threaded stud 23 (FIG. 8) which is engaged by a nut 24 which is rotatable in the box 11 and held therein by a compression spring 25. A lever 26 is rigidly secured to the pin 19. In the locked position of the bayonet device 20 in the recess 21, the lever 26 is engaged through a recess 27 in the box 11. The lever 26 serves to operate the bayonet device when the front-wheel fork 5 is folded and unfolded.

Articulated to the rods 10 of the frame by way of a transverse spindle 28 is a footrest 29 which can assume either of the two positions shown in FIGS. 1 and 2. The frame carries a conventional engine unit 30 towards its rear end. Carried on the bearing tube 9 is a handle 31 to facilitate transportation of the motorcycle when it is folded. The seat 32 is carried on the engine unit by way of two pairs of uprights 33, 34, one pair at the front and one pair at the rear; the bottom ends of the uprights are articulated to the engine by way of pivot pins 35, 36 and support members 37, 38 rigidly secured to the engine unit, whilst the upper ends of the uprights are articulated to the underside of the seat 32 by way of pivot pins 39, 40 and support members 41, 42, rigidly secured to the seat. Two struts 43 are articulated to the pins 40 and to other pins 44 on support members 45 rigidly secured to the engine unit.

Figure 5:
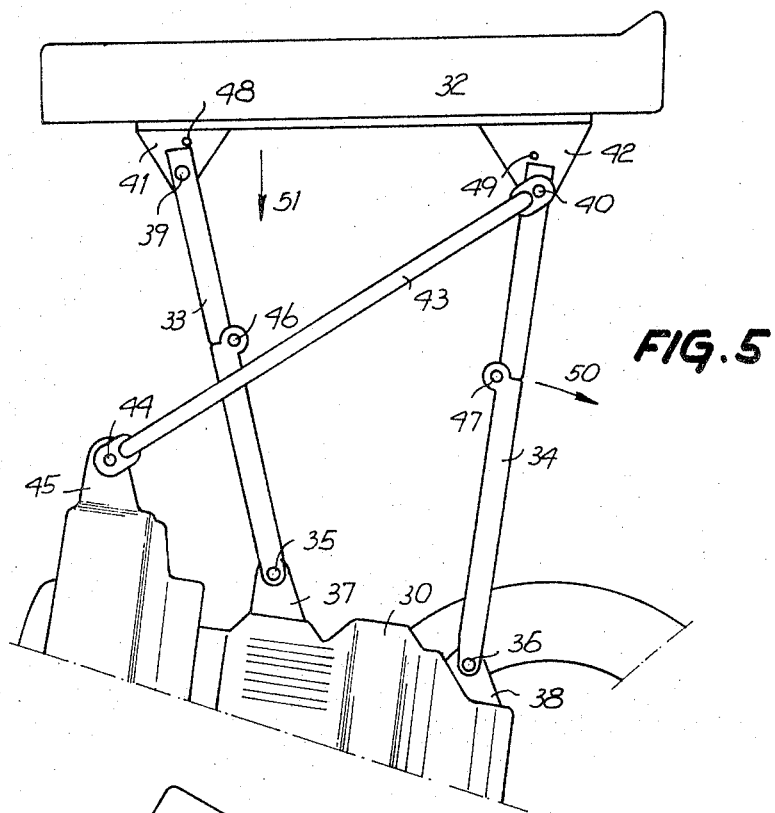
FIG. 5 is a side elevation of the seat when the same is in the position ready for use.
Figure 6:
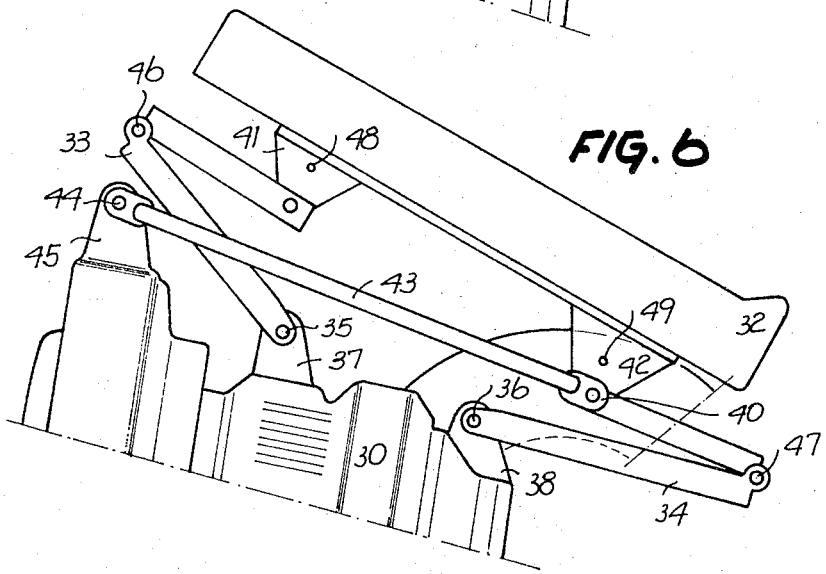
FIG. 6 is a side elevation of the seat in the folding position.

The struts 43 are rigid, but the members 33, 34 are foldable about pivot pins 46, 47 so that the mechanism can be folded between the two end positions shown in FIGS. 5 and 6. Conventional springs (not shown) disposed in the articulation facilities of which the pins 46, 47 form part tend to maintain the system in the position which is shown in FIG. 5 and in which the system is completely stable.

The top ends of the members 33, 34 extend upwards beyond the pivot pins 39, 40, and, when in the operative position shown in FIG. 5, bear against stops 48, 49 which project laterally from the support members 41, 42 and whose main purpose is to facilitate folding of the seat, when a rearward pull is applied, in the direction indicated by an arrow 50 (FIG. 5), to articulation 47 of the rear members 34, the two parts thereof rotate relatively to one another, that is, the distance between the pivots 36 and 40 is reduced and the seat 32 tends to rotate around the pivot 39 relatively to the members 33, as diagrammatically shown by an arrow 51. However, since the latter movement is impeded by the stop 48, the pivot movement actually occurs around the pivots 44 so that the members 33 also fold and the system can descend into the position which is shown in FIG. 6 and in which retention can be provided by any appropriate means. Once retention means has been released, the springs associated with the articulations 46, 47 return the system to the operative position shown in FIG. 5.

The operation of the various folding facilities will now be described.

The front-wheel fork 5 and the handlebars are maintained in the position shown in FIG. 1 by the nut 24 which pulls the pin 19 upwards and engages the two boxes 11, 22 with the respective ends of the tubular member 4. When the nut 24 is slackened, the handlebars are freed. Once the handlebars have been folded to the position shown in FIG. 8, the lever 26 can rotate to release the bayonet device 20, 21 of the fork.

The parts can be placed in the positions shown in FIG. 2. The same operations performed in reverse order restore the motorcycle to the position shown in FIG. 1.

The footrest 29 is rotated on the pivot 28 so that a space into which the front wheel 6 fits, when folded, is left between the rods 10.

The final item to be folded is the seat 32, which is placed in an appropriate position occupying a small space by the pivot 47 being moved backwards so that the rods 33, 34 rotatable around the pivots secured in the support members 37, 38 take up an angular position to lower the rear portion of seat 32, with the subsequent folding of rod 33 and rotation of rod 43 around pivot 44.

I claim:

1. A folding frame for a motorcycle, comprising mechanical means to enable handlebars and accessory elements and a front-wheel fork to be folded by rotational movements converging towards the frame and to enable a footrest to be folded to fit against an engine unit, a seat being pivoted to stationary parts of the motorcycle by pairs of rods each having a folding articulation and rotatable therearound and urged by resilient means into an extended position and braced by struts to inhibit oscillation of the link mechanism provided by said rods when the same is in the extended position.

2. A folding frame for a motorcycle according to claim 1, characterized in that the handlebars are folded by being rotated about a transverse spindle and comprising a nut device which, when the handlebars are in the operative position, is engaged with a screw-threaded projection forming part of the pivot of the front-wheel fork.

3. A folding frame for a motorcycle according to claim 2 characterized in that the front-wheel fork, together with all the elements steered by the said fork, is rotatable relatively to a horizontal axis, so that such elements take up a position between structural rods of the frame, the said fork being secured in the operative position by a bayonet device whose male element is the said screw-threaded projection for securing the handlebars.

4. A folding frame for a motorcycle according to claim 2, characterized in that the said screw-threaded projection has a radial actuating arm which is locked in the operative position of the handlebars by a recess in a handlebars coupling member.

5. A folding frame for a motorcycle according to claim 1, characterized in that to fold the seat, the top ends of at least one of the rods of each said pair thereof are associated with abutments which prevent such rod from approaching the seat, so that when the other rod is folded the said one rod is compelled to fold.